US007450015B2

(12) United States Patent
Singer et al.

(10) Patent No.: US 7,450,015 B2
(45) Date of Patent: Nov. 11, 2008

(54) SYSTEM AND METHOD FOR ENSURING LOCATION OF AN INDIVIDUAL WITHIN A DESIGNATED AREA

(75) Inventors: Michael H. Singer, Concord, NH (US); Douglas A. Richard, Tilton, NH (US)

(73) Assignee: Secure Care Products, Inc., Concord, NH (US)

( * ) Notice: Subject to any disclaimer, the term of this patent is extended or adjusted under 35 U.S.C. 154(b) by 243 days.

(21) Appl. No.: 11/021,150

(22) Filed: Dec. 23, 2004

(65) Prior Publication Data

US 2006/0152374 A1 Jul. 13, 2006

(51) Int. Cl.

| | |
|---|---|
| ***G08B 23/00*** | (2006.01) |
| ***G08B 13/00*** | (2006.01) |
| ***G08B 13/18*** | (2006.01) |
| ***G08B 13/14*** | (2006.01) |
| ***G08B 1/08*** | (2006.01) |
| ***G08B 21/00*** | (2006.01) |
| ***G05B 19/00*** | (2006.01) |

(52) U.S. Cl. .................... 340/573.4; 340/541; 340/556; 340/539.12; 340/572.1; 340/5.64; 340/686.6

(58) Field of Classification Search ............. 340/573.4, 340/539.1, 539.12, 539.21, 539.23, 572.1, 340/5.61, 5.64, 522, 541, 550–567, 686.6
See application file for complete search history.

(56) References Cited

U.S. PATENT DOCUMENTS

| | | | | |
|---|---|---|---|---|
| 4,272,762 | A * | 6/1981 | Geller et al. | 340/556 |
| 4,682,155 | A * | 7/1987 | Shirley | 340/573.4 |
| 4,812,810 | A * | 3/1989 | Query et al. | 340/545.3 |
| 5,440,290 | A | 8/1995 | McCullough et al. | 340/552 |
| 5,475,377 | A * | 12/1995 | Lee | 340/5.9 |
| 5,493,278 | A * | 2/1996 | Mackenzie et al. | 340/638 |
| 5,523,927 | A | 6/1996 | Gokey | 362/103 |
| 5,590,953 | A | 1/1997 | Haslam et al. | 362/276 |
| 5,597,233 | A | 1/1997 | Lau | 362/294 |
| 5,649,761 | A | 7/1997 | Sandell et al. | 362/276 |
| 5,802,479 | A | 9/1998 | Kithil et al. | 701/45 |
| 5,933,534 | A | 8/1999 | Yoshimoto et al. | 382/236 |
| 5,945,981 | A | 8/1999 | Paull et al. | 345/180 |
| 5,973,611 | A * | 10/1999 | Kulha et al. | 340/5.62 |
| 6,104,295 | A | 8/2000 | Gaisser et al. | 340/573.4 |
| 6,225,903 | B1 | 5/2001 | Soloway et al. | 340/542 |
| 6,225,906 | B1 * | 5/2001 | Shore | 340/573.4 |
| 6,310,548 | B1 | 10/2001 | Stephens, Jr. et al. | 340/540 |
| 6,348,691 | B1 | 2/2002 | Sandell et al. | 250/353 |
| 6,370,195 | B1 | 4/2002 | Watanabe et al. | 375/240.16 |
| 6,496,539 | B2 | 12/2002 | Watanabe et al. | 375/240.16 |
| 6,720,874 | B2 | 4/2004 | Fufido et al. | 340/541 |
| 6,803,945 | B1 | 10/2004 | Needham | 348/207.1 |

(Continued)

*Primary Examiner*—Benjamin C Lee
(74) *Attorney, Agent, or Firm*—Hayes Soloway PC

(57) ABSTRACT

A system and method for ensuring that a monitored individual is located within a designated area is provided. Generally, the system contains a portable transmitter capable of being removably secured to the individual. A proximity sensor is provided, which is capable of detecting the portable transmitter if the portable transmitter is located within a predefined range of the proximity sensor. The system also contains a sensor that is capable of determining if an object is located within a predefined area. A monitoring station is provided for performing an event if the portable transmitter is detected by the proximity sensor and the object is within the predefined area.

19 Claims, 4 Drawing Sheets

U.S. PATENT DOCUMENTS 6,812,836 B2 11/2004 Soloway et al. ............. 340/542
6,813,372 B2 11/2004 Standridge et al. .......... 382/107
2004/0100386 A1* 5/2004 Tendler .................. 340/573.3
2004/0189471 A1* 9/2004 Ciarcia et al. ............ 340/572.1
2005/0040952 A1* 2/2005 Dearing et al. ........... 340/572.2

* cited by examiner

SYSTEM AND METHOD FOR ENSURING LOCATION OF AN INDIVIDUAL WITHIN A DESIGNATED AREA

FIELD OF THE INVENTION

The present invention is generally related to security, and more particularly, is related to ensuring location of a monitored individual within a designated area.

BACKGROUND OF THE INVENTION

Ensuring location of an individual within a designated area is often of major concern to facilities having individuals that may wander from the designated area without notice. Certain medical conditions require constant monitoring of the individual to ensure proper health. Unfortunately, constant knowledge of the location of such individuals is very important in providing proper care. In addition, certain medical conditions of individuals may affect the memory of the individuals, thereby requiring monitoring of the location of individuals at all time to prevent the individuals from leaving the facility and becoming lost. An example of such an illness is Alzheimer's disease. Typically, although not always the case, such individuals are elderly and located at a retirement home or medical facility.

With the advancement of technology in the telecommunications and the medical industries, individuals disabled by a long-term medical condition are capable of remaining in their homes. Video cameras allow the individual to communicate with their doctor and be remotely seen at the same time. In addition, portable phones and push button devices allow the individual to inform others when they are in need of medical attention.

Persons assigned the task of ensuring proper medical treatment and monitoring of individuals having medical conditions typically hire a nurse or other medical caregiver to check on the medical condition of the individual on a daily basis. Typically, the hired nurse or caregiver will visit the home of the individual and administer required medical treatment during their visit. Unfortunately, for certain illnesses, the short visit provided by the nurse is not sufficient to provide constant monitoring of the individual requiring medical assistance or monitoring. As an example, an individual having a medical condition associated with loss of memory may wander from their home into their wooded backyard. Once in the backyard, due to their medical condition, the individual may not remember how to find their way back to their home, which may lead to medical concerns such as, but not limited to, hypothermia, dangers associated with wild animals, or even dehydration or hunger. Unfortunately, unless someone is always watching the individual having the medical condition, it is difficult to ensure that the individual does not leave his or her home without supervision. In addition, having someone constantly monitoring the location of an individual within a home or facility is quite expensive, thereby minimizing the availability of such a service.

Retirement homes and certain medical facilities also are assigned the task of ensuring that patients do not leave the facility without permission, specifically for the safety of the patient. Certain facilities limit the number of entry and exit points within their facility so as to minimize the number of areas requiring monitoring at all times. Unfortunately, this can restrict the flow of traffic into and out of the facility, in addition to still requiring constant monitoring. With the task of monitoring entry and exiting of the facility at all times assigned to a human, the process of monitoring is subjected to human error. As an example, if an individual is not watching the entry and exiting of the facility at the entry and exit points at all times, the patient may wander out of the facility.

To address this problem, facilities often have entry and exit points locked at all times. Unfortunately, an environment having all entry and exit points locked at all times renders itself more to a prison than to a medical facility or retirement home. Without being able to have a door or window open to let in fresh air and light, patients and individuals requiring constant monitoring or insurance of location within a facility may feel trapped and regret being at the facility.

Thus, a heretofore unaddressed need exists in the industry to address the aforementioned deficiencies and inadequacies.

SUMMARY OF THE INVENTION

Embodiments of the present invention provide a system and method for ensuring location of an individual within a designated area. Briefly described, in architecture, one embodiment of the system, among others, can be implemented as follows. The system contains a portable transmitter capable of being removably secured to the individual. A proximity sensor is provided, which is capable of detecting the portable transmitter if the portable transmitter is located within a predefined range of the proximity sensor. The system also contains a sensor that is capable of determining if an object is located within a predefined area. A monitoring station is provided for performing an event if the portable transmitter is detected by the proximity sensor and the object is within the predefined area.

The present invention can also be viewed as providing methods for insuring that an individual is located within a designated area. In this regard, one embodiment of such a method, among others, can be broadly summarized by the following steps: receiving a unique identification signal if a portable transmitter is located within a predefined range of a proximity sensor; receiving a sensed signal if an object is located within a predefined area; and performing an event if the unique identification signal has been received and the sensed signal has been received.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system and method is intended to assist in ensuring that an individual remains within a designated area. The following description provides the example of the system and method being used in a home of a monitored individual. It should be noted, however, that the present system and method may instead be utilized at a private or public facility having more than one monitored individual therein, such as, but not limited to, a nursing home or a section of a hospital. In addition, while the following describes monitoring of an individual, one having ordinary skill in the art will appreciate that the present system and method may be used to ensure that items remain within a facility. For example, radioactive material in a hospital can be stored within a container that also has a portable transmitter connected to the container. The present system and method would allow responsible parties to ensure that the radioactive material is not removed from the facility. Further description of the system and method is provided below.

Figure 1:
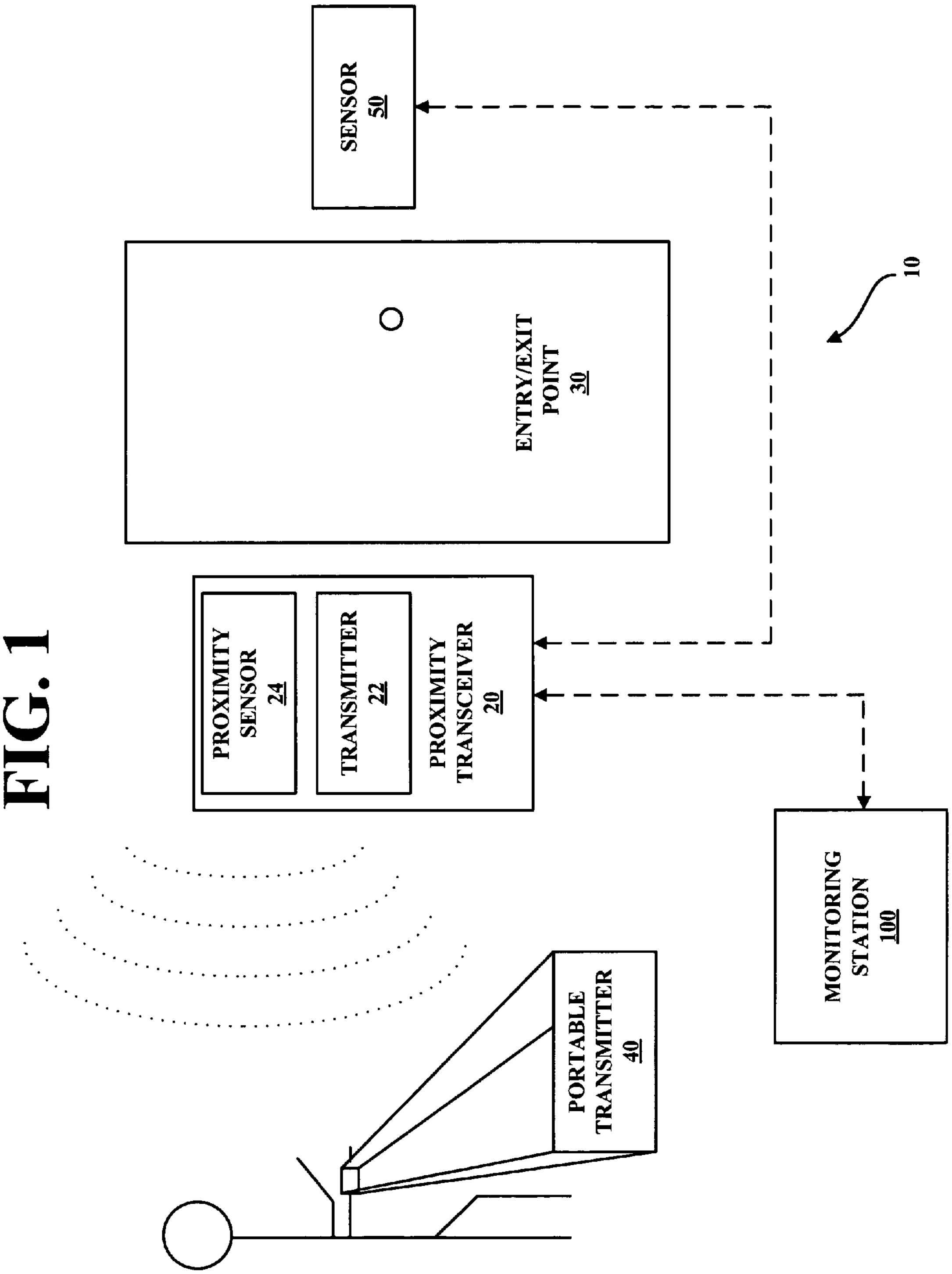
FIG. 1 is a block diagram illustrating general interaction of components of a monitoring system, in accordance with a first exemplary embodiment of the invention.

FIG. 1 is a block diagram illustrating general interaction of components of a monitoring system 10, in accordance with a first exemplary embodiment of the invention. As is shown by FIG. 1, the monitoring system 10 contains numerous portions. The monitoring system 10 contains a proximity transceiver 20. The proximity transceiver 20 is preferably located near an entry/exit point 30 that is to be monitored. While FIG. 1 shows the entry/exit point 30 to be a door, it should be noted that the entry/exit point 30 may instead be any opening that would allow a monitored individual to enter or exit a monitored facility. As an example, the entry/exit point may instead be a window or an air vent.

As is shown by FIG. 1, the proximity transceiver 20 contains a transmitter 22 and a proximity sensor 24 therein. One having ordinary skill in the art will appreciate that the proximity sensor 24 may instead be located remote from the proximity transceiver 20, where the proximity sensor 24 is capable of remotely communicating events, described in detail hereafter, to the proximity transceiver 20.

The proximity sensor 24 is capable of detecting whether a portable transmitter 40 is within a predefined range of the proximity sensor 24. As an example, the proximity sensor 24 may have a predefined range of approximately five feet, where the proximity sensor 24 is capable of detecting the portable transmitter 40 if the portable transmitter 40 is within five feet of the proximity sensor 24. Of course, the predefined range of the proximity sensor 24 may differ from five feet. In accordance with the first exemplary embodiment of the invention, the portable transmitter 40 is located on an individual that is being monitored (hereafter "the monitored individual) to assure that the individual does not leave the monitored facility. The portable transmitter 20 may be located on different parts of the monitored individual, the present example showing location on the wrist of the monitored individual. Each portable transmitter 40 may broadcast a unique identification signal having a specific radio frequency that is identifiable by the proximity sensor 24. Alternatively, all portable transmitters 40 may transmit the same identification signal. The proximity sensor 24 is preferably located near the entry/exit point 30 so as to be capable of detecting if the monitored individual is within a predefined range of the entry/exit point 30.

Figure 2:
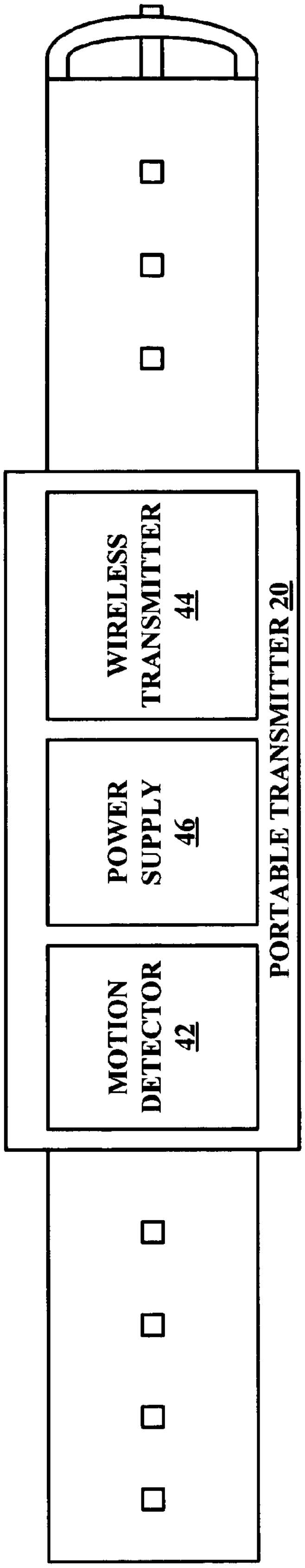
FIG. 2 is a block diagram further illustrating the portable transmitter.

The portable transmitter 40 which may be permanently or removably attached to the monitored individual is preferably a wireless transmitter that is capable of being detected by the proximity sensor 24. Since wireless transmitters typically consume a large amount of power, the wireless transmitter has a motion detector 42, as is explained in detail below. It should be noted that the portable transmitter 40 may alternatively not have a motion detector 42. FIG. 2 is a block diagram further illustrating the portable transmitter 40. The motion detector 42 is capable of shutting down or decreasing power from a power supply 46 to a wireless transmitter 44. Specifically, a switch (not shown) located within the motion detector 42 is capable of determining when the monitored individual is moving. If a predetermined time period passes without the monitored individual moving, the motion detector 42 prevents or decreases power from the power supply 46 to the wireless transmitter 44, thereby, essentially shutting down the wireless transmitter 44. Since wireless transmitters require a fairly large amount of power to maintain the capability of wirelessly transmitting signals, use of the motion detector 42 for regulating power consumption by the portable transmitter 40 allows a smaller power supply 46 to be used, thereby decreasing size and weight of the portable transmitter 40.

Returning to FIG. 1, the transmitter 22 located within the proximity transceiver 20 is capable of transmitting a signal to a sensor 50 to determine if an object is located between the transmitter 22 and the sensor 50. In accordance with the first exemplary embodiment of the invention, the transmitter 22 transmits an optical signal (e.g., a beam of light) that is received by the sensor 50, where the sensor 50 is an optical sensor. If an object is located between the transmitter 22 and the sensor 50, the optical signal transmitted by the transmitter 22 will not be received by the sensor 50, thereby signifying that there is an object located between the transmitter 22 and the sensor 50 (e.g., a door is open).

The monitoring system 10 also contains a monitoring station 100 that is in communication with the proximity transceiver 20. Communication capability between the monitoring station 100 and the proximity transceiver 20 may be provided wirelessly or via use of a standard wiring connection. In accordance with the first exemplary embodiment of the invention, the proximity transceiver 20 transmits a detected unique identification signal to the monitoring station 100, received from proximity sensor 24, each time the proximity sensor 24 detects a portable transmitter 40 within its predefined range. When the detected signal is received by the monitoring station 100, the monitoring station 100 interprets the unique identification signal to know that a portable transmitter 40 has been detected by the proximity sensor 24.

Elaborating on the above-mentioned, in accordance with the first exemplary embodiment of the invention, the proximity sensor 24 broadcasts the unique identification signal detected from the portable transmitter 40, to the monitoring station 100, via the proximity transceiver 20, when the proximity sensor 24 detects the portable transmitter 40 and receives the unique identification signal. As is explained in detail below, the unique identification signal may be used by the monitoring station 100 to note when a specific monitored individual is within a predefined distance of the entry/exit point 30. In accordance with a second exemplary embodiment of the invention, the time of detecting the portable transmitter 40, the monitored individual associated with the portable transmitter 40, and the date of the detection of the portable transmitter 40 are stored within the monitoring station 100.

In accordance with the first exemplary embodiment of the invention, the sensor 50 transmits a sensed signal to the monitoring station 100 if the sensor 50 does not receive the optical signal. As will be explained in further detail below, the monitoring station 100 is capable of sounding an alarm or performing another event if the sensed signal and a detected unique identification signal have been received by the monitoring station 100. Alternatively, the monitoring station may cause the alarm to sound if only the detected unique identification signal or the sensed signal has been received by the monitoring station 100. In addition, instead of sounding the alarm, the monitoring station 100 may perform any of a number of other events that will immediately inform a person watching the monitored individual within the monitored facility that the monitored individual is within the predefined range of the proximity sensor 24 and the optical signal is not being received by the sensor 50, thereby signifying that there is an object between the transmitter 22 and the sensor 50.

It should be noted that a bypass feature may be provided to the monitoring system 10 so as to prevent the sensor 50 from determining if it is receiving the optical signal and to prevent the proximity sensor 24 from detecting identification signals of portable transmitters 40. As an example, the bypass feature may take the form of a keypad (not shown) placed outside of the entry/exit point 30. When a predefined code is entered into the keypad, the bypass feature may be activated, thereby allowing a monitored individual to enter or exit the monitored facility. As another example, the bypass feature may be activated with pressing of a doorbell located outside of the entry/exit point 30 so that when the entry/exit point 30 is opened a monitored individual may enter the monitored facility without the monitoring station 100 sounding an alarm. After a predefined period, the monitoring system 10 may turn on again.

The monitoring station 100 can be implemented in software (e.g., firmware), hardware, or a combination thereof. In the currently contemplated best mode, the monitoring system 100 is implemented partially in hardware and partially in software, as an executable program, and is executed by a special or general purpose digital computer, such as a personal computer (PC; IBM-compatible, Apple-compatible, or otherwise), workstation, minicomputer, or mainframe computer. An example of a general purpose computer that can perform functions of the monitoring station 100 is shown in FIG. 3.

Figure 3:
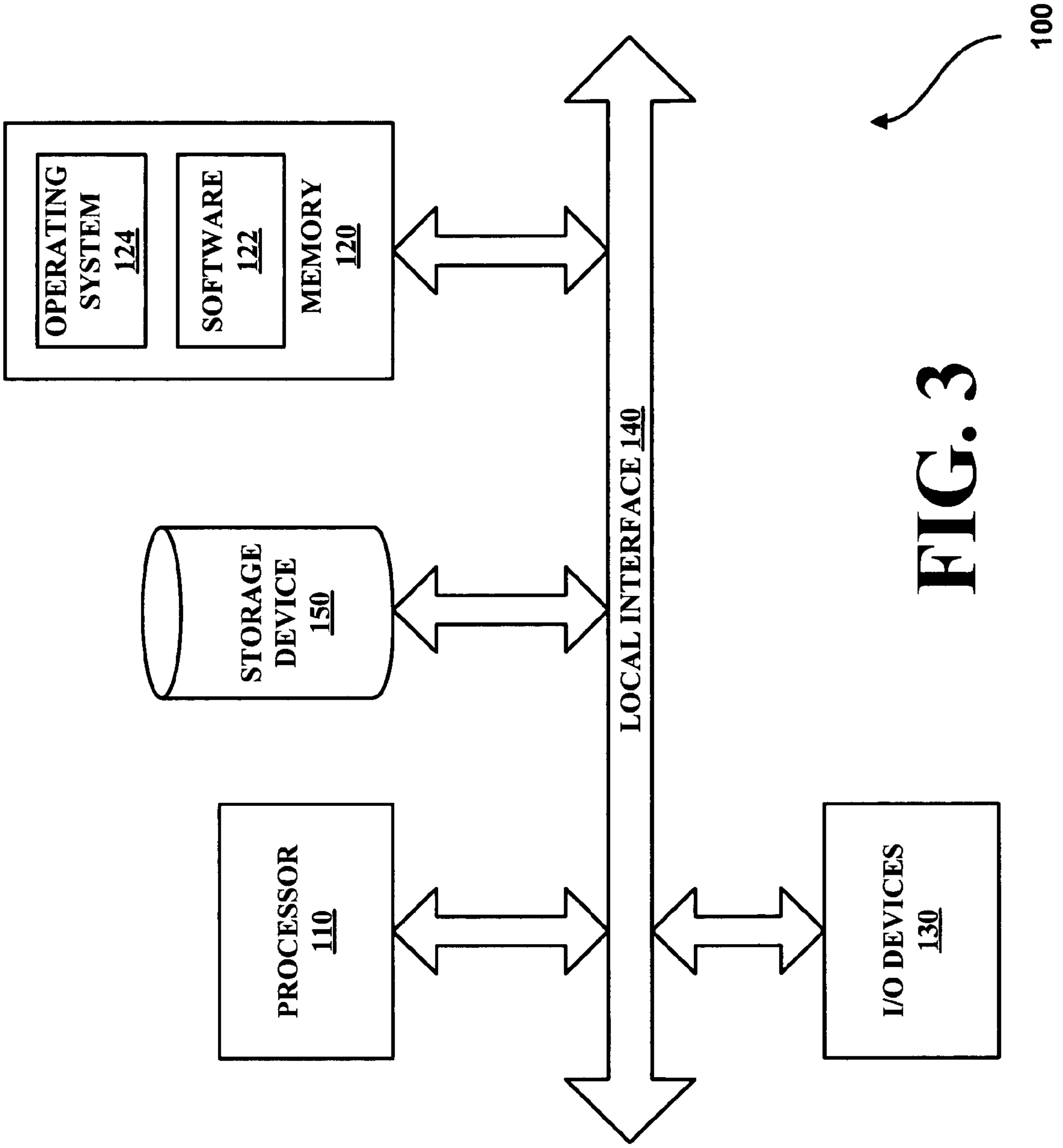
FIG. 3 is a block diagram illustrating an example of a general purpose computer that can perform functions of the monitoring station.

Generally, in terms of hardware architecture, as shown in FIG. 3, the monitoring station 100 includes a processor 110, memory 120, and one or more input and/or output (I/O) devices 130 (or peripherals) that are communicatively coupled via a local interface 140. The local interface 140 can be, for example but not limited to, one or more buses or other wired or wireless connections, as is known in the art. The local interface 140 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The monitoring station 100 also contains a storage device 150 for storing data therein. As an example, in accordance with the first exemplary embodiment of the invention, the data may be a series of unique identifications associated with the portable transmitter 40. Storage of the identifications allows the monitoring station 100 to determine if detection of a unique identification signal transmitted by the portable transmitter 40, which is detected by the proximity sensor 24 and received from the proximity transceiver 20, should result in sounding of an alarm. This process is explained further below. In accordance with the second exemplary embodiment of the invention, the identification associated with the portable transmitter 40 is stored within the storage device 150, as well as the time and date of detection of the portable transmitter 40 by the proximity sensor 24, as transmitted by the proximity transceiver 20. It should be noted that information regarding a monitored individual wearing the portable transmitter 40 may also be stored within the storage device 150.

The processor 110 is a hardware device for executing software 122, particularly that stored in memory 120. The processor 110 can be any custom made or commercially available processor, a central processing unit (CPU), an auxiliary processor among several processors associated with the computer, a semiconductor based microprocessor (in the form of a microchi or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 120 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software 122 in the memory 120 may include one or more separate programs, each of which comprises an ordered listing of executable instructions for implementing logical functions. In the example of FIG. 3, the software 122 in the memory 120 defines the functionality performed by the monitoring station 100 in accordance with the present invention. A suitable operating system (0/S) 124 may also be stored within the memory 120. A nonexhaustive list of examples of suitable commercially available operating systems 124 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS available from Palm Computing, Inc., and Windows CE available from Microsoft Corporation). The operating system 124 essentially controls the execution of other computer programs, such as that defined by the software 122 of the monitoring station 100, and provides scheduling, input-output control, file and data management, memory management, and communication control and related services.

The I/O devices 130 may include input devices, for example but not limited to, a keyboard, mouse, scanner, microphone, or other input devices. Furthermore, the I/O devices 130 may also include output devices, for example but not limited to, an alarm, a printer, display, or other output devices. Finally, the I/O devices 130 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the monitoring station 100 is in operation, the processor 110 is configured to execute the software 122 stored within the memory 120, to communicate data to and from the memory 120, and to generally control operations of the monitoring station 100 pursuant to the software 122. The software 122 and the O/S 124, in whole or in part, but typically the latter, are read by the processor 110, perhaps buffered within the processor 110, and then executed.

When the monitoring system 100 is implemented in software, as is shown in FIG. 3, it should be noted that the monitoring system 100 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The monitoring system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the monitoring station 100 is implemented in hardware, the monitoring station 100 can be implemented with any or a combination of the following technologies, which are each well known in the art: a discrete logic circuit(s) having logic gates for implementing logic functions upon data signals; an application specific integrated circuit (ASIC) having appropriate combinational logic gates; a programmable gate array(s) (PGA); and a field programmable gate array (FPGA), among others.

Figure 4:
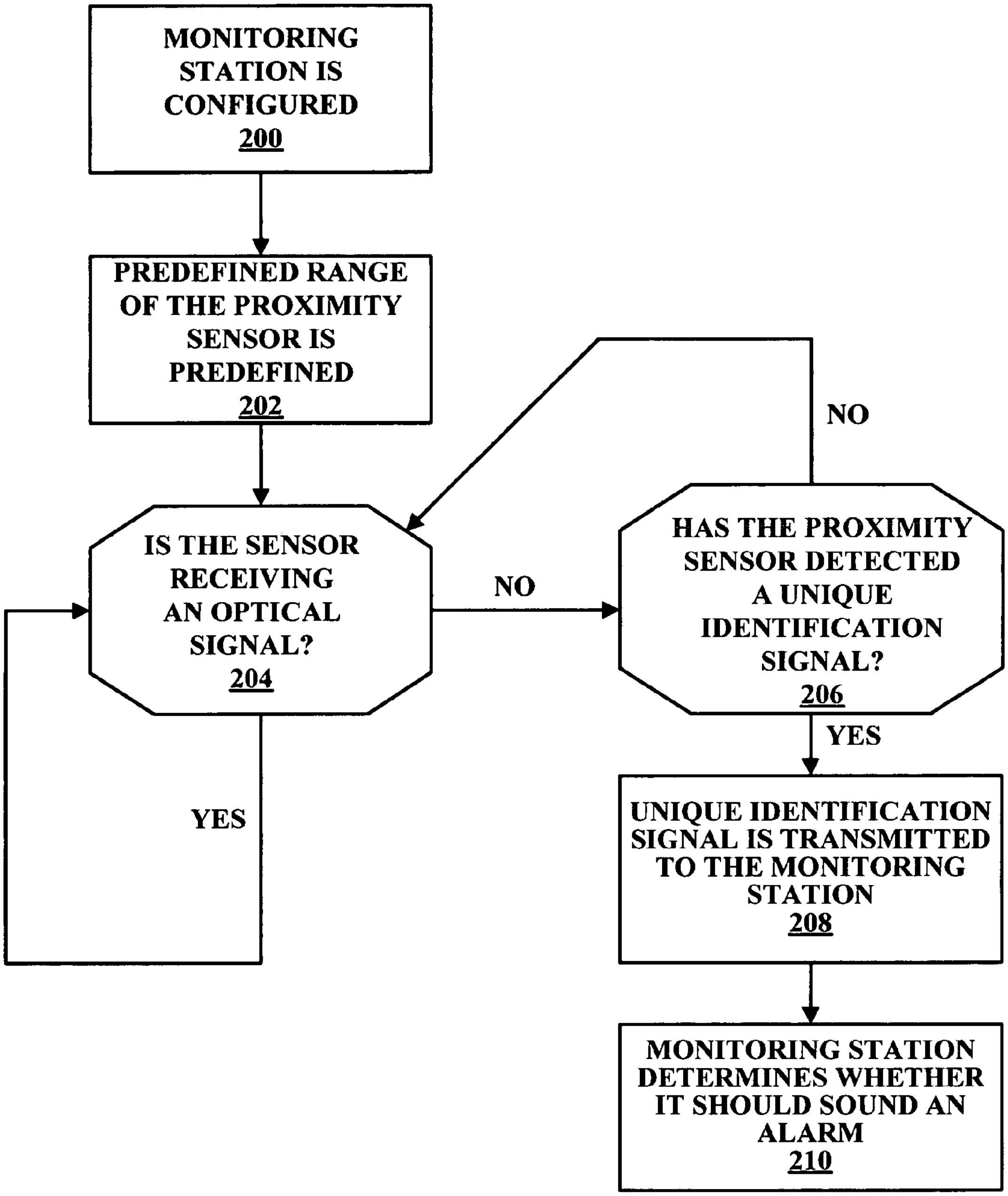
FIG. 4 is a flowchart illustrating a method of ensuring location of an individual within a designated area, in accordance with the first exemplary embodiment of the invention.

FIG. 4 is a flowchart illustrating a method of ensuring location of an individual within a designated area. It should be noted that any process descriptions or blocks in flowcharts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 200, the monitoring station 100 is configured. Configuration of the monitoring station 100, in accordance with the first exemplary embodiment of the invention, entails storing therein identification associated with each portable transmitter 40 located within a monitored facility. The identification allows the monitoring station 100 to determine to which portable transmitter 40 a received unique identification signal belongs when the signal is received from the proximity transceiver 20.

In accordance with the second exemplary embodiment of the invention, configuration of the monitoring station 100 entails storing therein identification associated with each portable transmitter 40 located within a monitored facility and storing the name, and/or other information regarding the monitored individual wearing each portable transmitter 40. Storing the name and/or other information regarding the monitored individual wearing each portable transmitter 40 allows the monitoring station 100 to determine who is wearing a detected portable transmitter 40 when a detected unique identification signal is received from the proximity transceiver 20.

A predefined (i.e., detection) range of the proximity sensor 24 is predefined (block 202) prior to use of the monitoring system 10. Since the proximity sensor 24 is located next to the entry/exit point 30, the predefined range of the proximity sensor 24 is capable of sensing when a portable transmitter 40 is within the predefined range of the entry/exit point 30. As an example, the predefined range of the proximity sensor 24 may be set at five feet, thereby detecting when a portable transmitter 40 is within five feet of the proximity sensor 24 or entry/exit point 30.

As is shown by block 204, a determination is made as to whether the sensor 50 is receiving an optical signal. If the sensor 50 is receiving an optical signal, the monitoring system 10 continues to determine if the sensor 50 is receiving an optical signal. Alternatively, as has been mentioned above, a different method of determining if an object is located between the sensor 50 and the transmitter 22, or simply obstructing the entry/exit point 30, may be used.

If the sensor 50 is not receiving the optical signal a determination is made as to whether the proximity sensor 24 has detected a unique identification signal transmitted by a portable transmitter 40 (block 206). If the proximity sensor 24 has not detected a unique identification signal transmitted by a portable transmitter 40 a determination is again made as to whether the sensor 50 is receiving an optical signal. If the proximity sensor 24 has detected a unique identification signal, the unique identification signal is transmitted to the monitoring station 100 by the proximity transceiver 20 (block 208). When the monitoring station 100 receives the unique identification signal from the proximity transceiver 20, the monitoring station 100 determines whether it should sound an alarm (block 210), signifying that the monitored individual is within detection range of the entry/exit point 30 and the sensor 50 is not receiving the optical signal from the transmitter 22. To determine whether the monitoring station 100 should sound the alarm, the monitoring station 100 checks the identification stored within the storage device 150. If the unique identification signal is stored within the storage device 150, the alarm sounds.

It should be noted that if the entry/exit point 30 is a door, opening of the door would result in the sensor 50 not receiving the optical signal. As a result, sounding of the alarm may mean that the monitored individual has exited the monitored facility, or is about to exit the monitored facility.

In accordance with the second exemplary embodiment of the invention, when the monitoring station 100 receives the unique identification signal from the proximity transceiver 20, the monitoring station 100 also stores the time and date that the proximity sensor 24 detected the portable transmitter 40. Therefore, in accordance with the second exemplary embodiment of the invention, the storage device 150 contains a database of the names of the monitored individuals wearing portable transmitters 40 at the time of detection by the proximity sensor 24, and the time and date of detection by the proximity sensor 24.

It should be emphasized that the above-described embodiments of the present invention are merely possible examples of implementations, merely set forth for a clear understanding of the principles of the invention. Many variations and modifications may be made to the above -described embodiments of the invention without departing substantially from the spirit and principles of the invention. All such modifications and variations are intended to be included herein within the scope of this disclosure and the present invention and protected by the following claims.

What is claimed is:

1. A system for ensuring location of an individual or apparatus within a designated area, comprising:

a portable transmitter for removably secured to said individual or apparatus;

a proximity sensor located in a predefined area of said designated area for detecting said portable transmitter if said portable transmitter is located within a predefined range of said proximity sensor;

an optical sensor for determining if the individual or apparatus is located within the predefined area of said designated area, wherein said optical sensor receives an optical signal from an optical signal transmitter if the individual or apparatus is not within said predefined area and wherein the predefined area is an area before an entry/exit point defined by a space between the optical sensor and the optical signal transmitter; and a monitoring station for performing an event if said optical sensor does not receive said optical signal and said portable transmitter is detected by said proximity sensor wherein said monitoring station continually monitors said optical sensor and said proximity sensor independently;

wherein said event is sounding of an alarm.

2. The system of claim 1, wherein said entry/exit point is a door.

3. The system of claim 1, wherein said portable transmitter further comprises:

a power source;

a motion sensor; and a wireless transmitter capable of transmitting a unique identification.

4. The system of claim 3, wherein said wireless transmitter is turned off if said motion sensor determines that there is a lack of motion of said individual or apparatus over a predefined period.

5. The system of claim 1, further comprising a bypass device for preventing said monitoring station from performing said event if said portable transmitter is detected by said proximity sensor and said individual or apparatus is within said predefined area.

6. The system of claim 5, wherein said bypass device is selected from the grou consisting of a door bell and a keypad.

7. The system of claim 1, wherein the proximity sensor is located on a proximity transceiver, and where the proximity transceiver is capable of transmitting a unique identification signal, detected and received from the proximity sensor, to the monitoring station.

8. The system of claim 1, wherein obstruction of said optical signal to said sensor allowing said sensor to determine if said individual or apparatus is located within said predefined area.

9. A monitoring station for assisting in ensuring location of an individual or apparatus within a designated area, comprising:

a memory; and a processor configured by said memory to perform the steps of:

determining receipt of a unique identification signal from and indicating that a portable transmitter removably secured to said individual or apparatus has been detected by a proximity sensor located within a predefined area of said designated area, wherein said determination step is independent of a sensed signal;

determining receipt of the sensed signal from an optical sensor indicating that the individual or apparatus is located within said predefined area between the sensor and an optical signal transmitter, wherein said determination step is continuous; and performing an event if said unique identification signal has been received and said sensed signal has been received;

wherein said event is sounding an alarm.

10. The monitoring station of claim 9, further comprising a storage device, wherein a time and date of detection of said unique identification signal is stored within said storage device.

11. The monitoring system of claim 9, wherein said monitoring station does not perform said step of performing an event if a bypass signal is received by said monitoring station.

12. A method of ensuring location of an individual or apparatus within a designated area, comprising the steps of:

receiving a unique identification signal from a portable transmitter removably secured to said individual or apparatus, independent of a sensed signal, if the portable transmitter is located within a predefined range of a proximity sensor located within a predefined area of said designated area;

receiving the sensed signal by a monitoring system which continues to determine if an optical sensor is receiving an optical signal until the individual or apparatus is located within said predefined area between the sensor and an optical signal transmitter; and performing an event if said unique identification signal has been received and said sensed signal has been received;

wherein said performed event is sounding of an alarm.

13. The method of claim 12, further comprising the steps of: detecting a unique identification signal transmitted by said portable transmitter if said portable transmitter is within said predefined range of said proximity sensor; and determining if said individual or apparatus is located within said predefined area.

14. The method of claim 12, further comprising the step of determining what individual or apparatus is associated with said detected unique identification signal.

15. The method of claim 12, further comprising the step of storing a date and time if said unique identification signal has been received and said sensed signal has been received.

16. A system for ensuring location of an individual or object within a designated area, comprising:

means for receiving a unique identification signal from a portable means for transmitting removably secured to said individual or object, independent of a sensed signal, said means for receiving is located within a predefined area of said designated area;

means for continuously receiving the sensed signal if the individual or object is located within said predefined area between an optical signal transmitter and an optical sensor; and means for performing an event if said unique identification signal has been received and said sensed signal has been received;

wherein said performed event is sounding of an alarm.

17. The system of claim 16, wherein said means for receiving said unique identification signal receives said unique identification signal if said portable means for transmitting is within a predefined range of said means for receiving if said portable means is within said predefined range.

18. The system of claim 17, further comprising means for bypassing said event.

19. A system for ensuring location of an individual or apparatus within a designated area, comprising:

a portable transmitter for removably secured to said individual or apparatus;

a proximity sensor located within a predefined area of said designated area for detecting said portable transmitter if said portable transmitter is located within a predefined range of said proximity sensor;

an optical sensor for determining if the individual or apparatus is located within said predefined area between the optical sensor and an optical signal transmitter; and a monitoring station for performing an event if said portable transmitter is detected by said proximity sensor and said optical sensor determines if the individual is located between the optical sensor and said optical signal transmitter, wherein said monitoring station continually monitors said optical sensor and said proximity sensor independently;

wherein said performed event is sounding of an alarm.

* * * * *

UNITED STATES PATENT AND TRADEMARK OFFICE

CERTIFICATE OF CORRECTION

PATENT NO. : 7,450,015 B2
APPLICATION NO. : 11/021150
DATED : November 11, 2008
INVENTOR(S) : Singer et al.

It is certified that error appears in the above-identified patent and that said Letters Patent is hereby corrected as shown below:

Column 9, Line 65, Claim 6 “grou” should be --group--

Signed and Sealed this

Thirtieth Day of December, 2008

JON W. DUDAS
*Director of the United States Patent and Trademark Office*